(12) United States Patent
Holverson et al.

(10) Patent No.: US 11,999,020 B2
(45) Date of Patent: Jun. 4, 2024

(54) METHOD AND APPARATUS FOR MONITORING WELD CELL

(71) Applicant: Illinois Tool Works Inc., Glenview, IL (US)

(72) Inventors: Todd E. Holverson, Appleton, WI (US); William R. Giese, Monee, IL (US); Douglas W. Krebs, Springboro, OH (US); Kenneth S. Dobson, Northville, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/903,575

(22) Filed: Sep. 6, 2022

(65) Prior Publication Data
US 2023/0146710 A1  May 11, 2023

Related U.S. Application Data

(63) Continuation of application No. 15/864,687, filed on Jan. 8, 2018, now abandoned, which is a continuation of application No. 13/253,231, filed on Oct. 5, 2011, now Pat. No. 9,862,048.

(60) Provisional application No. 61/390,855, filed on Oct. 7, 2010.

(51) Int. Cl.
| | |
|---|---|
| *B23K 9/095* | (2006.01) |
| *B23K 9/10* | (2006.01) |
| *B23K 9/32* | (2006.01) |
| *G06Q 10/06* | (2023.01) |
| *G06Q 50/04* | (2012.01) |
| *G07C 1/10* | (2006.01) |

(52) U.S. Cl.
CPC ............. *B23K 9/0953* (2013.01); *B23K 9/10* (2013.01); *B23K 9/32* (2013.01); *G06Q 10/06* (2013.01); *G06Q 50/04* (2013.01); *G07C 1/10* (2013.01); *Y02P 90/30* (2015.11)

(58) Field of Classification Search
CPC ...... B23K 9/0953; B23K 9/10; B23K 9/1006; B23K 9/32; G06Q 10/06; G06Q 50/04; G07C 1/10; Y02P 90/30
USPC ........ 219/130.01, 130.5, 137.2, 130.21, 136; 700/159, 169
See application file for complete search history.

(56) References Cited

U.S. PATENT DOCUMENTS

| | | | | |
|---|---|---|---|---|
| 5,808,885 | A | * | 9/1998 | Dew ................. B23K 9/1062 219/110 |
| 6,021,361 | A | * | 2/2000 | Taninaga ............. B25J 9/1679 901/41 |
| 6,583,386 | B1 | | 6/2003 | Ivkovich |

(Continued)

FOREIGN PATENT DOCUMENTS

SG  147352 A1  11/2008

OTHER PUBLICATIONS

Database WPI , Week 200924 , Thompson Scientific , London GB; AN 2009-B50663 , XP002667577.

(Continued)

*Primary Examiner* — Dana Ross
*Assistant Examiner* — James F Sims, III
(74) *Attorney, Agent, or Firm* — McAndrews, Held & Malloy, Ltd.

(57) ABSTRACT

A method and apparatus for monitoring weld cell and related activity is disclosed. The activity is sensed using a variety of sensors, and reported to the controller, or to a remote location.

10 Claims, 2 Drawing Sheets

(56) References Cited

U.S. PATENT DOCUMENTS

| | | | |
|---|---|---|---|
| 7,375,304 B2 | 5/2008 | Kainec et al. | |
| 7,518,484 B2 | 4/2009 | Albarado | |
| 7,996,276 B2 | 8/2011 | Blankenship et al. | |
| 2003/0167238 A1* | 9/2003 | Zeif | G06Q 10/0639 |
| | | | 705/400 |
| 2005/0127052 A1 | 6/2005 | Spencer | |
| 2005/0197115 A1 | 9/2005 | Clark et al. | |
| 2005/0258154 A1 | 11/2005 | Blankenship | |
| 2007/0052543 A1 | 3/2007 | Albarado | |
| 2007/0080150 A1 | 4/2007 | Albrecht | |
| 2008/0116186 A1 | 5/2008 | Luck et al. | |
| 2008/0276179 A1 | 11/2008 | Borenstein | |
| 2009/0109180 A1* | 4/2009 | Do | G06F 21/31 |
| | | | 345/173 |
| 2009/0313549 A1* | 12/2009 | Casner | H04L 67/01 |
| | | | 715/740 |
| 2010/0076692 A1* | 3/2010 | Vock | G01P 3/50 |
| | | | 702/19 |
| 2010/0224610 A1 | 9/2010 | Wallace | |

OTHER PUBLICATIONS

International Searching Authority, Search Report and Written Opinion, Application No. PCT/US2011/055225, dated Feb. 1, 2012,, 9 pages.

\* cited by examiner

METHOD AND APPARATUS FOR MONITORING WELD CELL

FIELD OF THE INVENTION

The present invention relates generally to the art of weld cells. More specifically, it relates to monitoring the activity that occurs in a weld cell.

BACKGROUND OF THE INVENTION

A weld cell is an area or room in which welding and related tasks are performed. Tracking activity in the weld cell can be used for a variety of purposes, including helping efficiency, quality, reliability, testing and notifications. This invention relates to tracking welding and/or related tasks and/or welding or related information.

Welding can include a tack weld and a final weld. The performance of a weld can includes time during which the arc is on (arc-on time) and time during which the gun is in hand. In addition to the time-based information of a weld, related weld information includes the weld parameters (current, voltage, process cycle time, ramp rates, etc).

Related tasks can be varied, and include tasks such as grinding and/or scraping for cosmetics fit up and/or spatter removal, loading parts, unloading parts, looking for parts, moving parts, waiting for parts (from another weld or for delivery), and ordering parts. Many of these related tasks are done in an inefficient manner, and many are done by a more highly skilled worker than necessary. For example, welding often requires a high level of skill, but moving parts does not. Other information that can be desirable relates to the operator, such as health and safety information (heart rate, heat stress or core or head body temperature, movement, pinch points (i.e., hands, fingers, toes, feet, etc. . . . ), fume exposure, repetitive motion. It is also desirable to know quality metrics such as Overall Equipment Effectiveness (OEE), Overall Process Effectiveness (OPE), weld sequence, time spent waiting, and pre-heat, inter-pass and post temperature.

Many companies are pursuing lean manufacturing, six sigma principles, single piece flow, etc., in an effort to improve efficiency. The breakdown of activities of the employee(s) and an understanding of waste and through-put constraints in manufacturing is useful information, particularly for continuous improvement. Reducing or eliminating reducing non-value added bottle necks and activities can improve throughput and overall weld time. Operators often spend more time grinding and fitting parts than welding but data to determine the relative times are not readily available. Given the lack of information and hard data regarding weld cell activity changing production flow is sometimes done as a matter of guesswork, instead of based on hard facts. Data is needed to know when and how to make changes, as wells as to evaluate the result of the change. Such data has been particularly difficult to obtain in a weld cell.

Accordingly, a method and apparatus for tracking well cell activity is desired.

SUMMARY OF THE PRESENT INVENTION

According to a first aspect of the invention a welding type system includes a power source, a controller and at least one weld cell activity sensor.

According to a second aspect of the invention a system for tracking weld cell activity includes a first sensor disposed to be responsive to at least a first weld cell activity. A transmitter that is connected to the first sensor transmits information indicative of the at least a first weld cell activity. A receiver receives the transmitted information.

The sensor includes an RF transmitter disposed to transmit information indicative of the activity tracked in one embodiment.

The controller includes a network or internet gateway/interface for providing the transmitted information over the network in another embodiment.

The transmitted information provided over the network includes time-related data and/or relates to one or more of the arc being on, the gun being on, time spent grinding, time spent sanding, time spent loading, time spent waiting for a temperature, and time spent fitting up in various embodiments.

Additional sensors are provided in various embodiments.

Other principal features and advantages of the invention will become apparent to those skilled in the art upon review of the following drawings, the detailed description and the appended claims.

Figure 1:
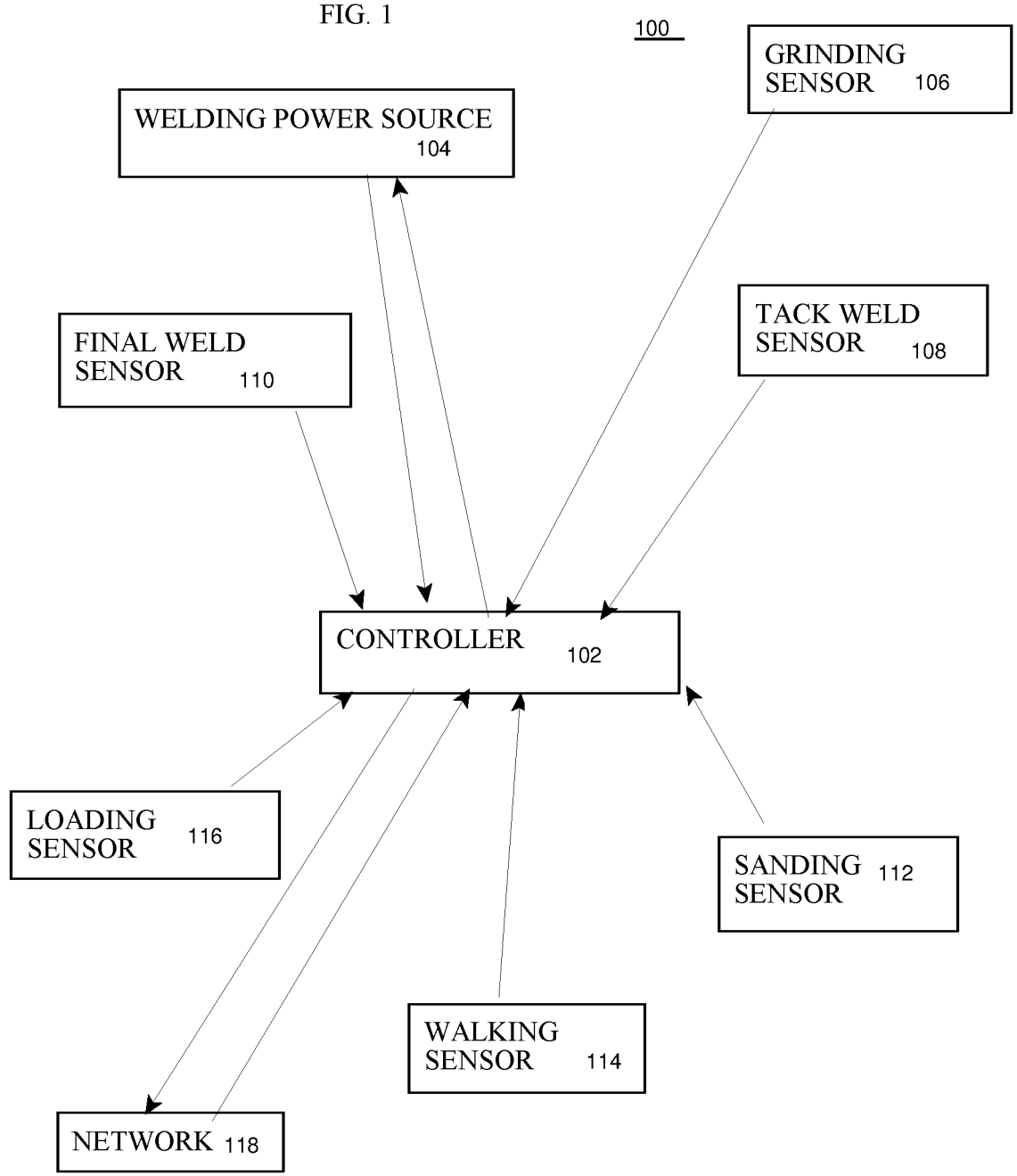
FIG. 1 is block diagram showing one embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular activities and particular ways of tracking and reporting those activities, it should be understood at the outset that the invention can also be implemented to track and report other activities, and in other manners. A weld cell typically includes a welding system, including a power source and a controller. The present invention can be integrated with the controller and sense the output of the power source as needed, or it can be stand alone system used with or without a power source.

Some weld cell activities/values tracked in accordance with the present invention include final weld, tack weld (time spent in either welding operations can be determined using arc-on time, weld parameters, gun in hand time), scraping, grinding, waiting, loading and unloading. Various methods and sensors for tracking will be described with respect to one or more particular weld cell activities, but it is intended they could be used with other weld cell activities, and/or they could be combined as desired to make a more useful, robust or economical sensing method. Weld cell activity, as used herein, includes one or more of the tasks commonly performed in a weld cell. Weld cell activity tracking sensor is a sensor that detects when a weld cell activity starts, ends, or is being performed.

After the information is sensed it can be provided to the welding system controller, or it can be transmitted outside the weld cell, such as to the plant operator, manager, etc. The transmission can be wired or wireless. In the preferred embodiment a Monnit® RF sensor system is used. The information is sensed, transmitted by RF to a network or internet gateway, and then provided over the internet to a monitoring server, and then provided on a graph, chart, to a pc, on a dashboard, by email, etc., if desired, to the plant operator, supervisor or others. The data provided is preferably time related data for the activity. Time related data for an activity, as used herein, is data responsive to the beginning, end or duration of a weld cell activity. A network interface is an interface that allows information to be sent or received over a network. An internet gateway is a gateway that allows information to be sent or received over the internet, For example, a reed switch can be placed around a weld cable, and the output of the reed switch provided to the RF sensor system. When the arc is on, the magnetic field from the current in the weld cable is sensed by the reed switch, and the RF transmitter sends a signal. That signal is responsive to the arc being on. When the arc is off, the reed switch changes state, and another RF signal can be sent, indicating the arc is off An alternative embodiment provides that RF signals are repeatedly sent so long as the arc is on. Thus the absence of the RF signal indicates the arc is off. The gateway receives the RF signals and provides the information over the internet. The on/off times are used to determine the arc on time (the difference between RF signals or the duration of repeated RF signals.

Grinding/sanding can be done for parts fit up and for spatter removal. The invention can be used to detect time needed for grinding/sanding for either reason. amount of time an operator is grinding or sanding. One embodiment provides that time spent operating the grinder/sander and time spent on "air moves" with grinder in hand (such as getting the grinder from its resting place, moving to the part, moving around the part, positioning the part, positioning your body, putting grinder back, etc) are tracked. The manner in which the time operating the grinding and time on air moves are tracked can be any of the methods discussed herein.

Multiple methods are possible to attempt to record the operator's time allocation. Many of these techniques will be useful for sensing other activity in the weld cell. These include those described below with respect to other activities and current sense, air flow sense, triangulation of position, hose retract sensor, visual—spark detection, count of discs consumed per day (combined with manual recording), grinding face shield usage/consumption, vibration on grinding shield, vibration on fixture, kineseology motion monitoring, acoustic monitoring, deriving data from a robot (for air moves, e.g.).

One embodiment provides for sensing the source of power for the device (current, air, hydraulics . . . ) and can be used for a number of activities, including grinding and sanding. Also, a reed switch, hall effect, or other current sensor on the grinder power cord could be used to detect operation of the grinder. GPS location of the tool and/or operator via some form of triangulation, pressure sensors in floor mats, and/or light can be used to locate the operator, and/or tool and used to identify many activities in the weld cell. Sensing when the hose, cord, etc. is pulled from the retract spool is another method able to detect many activities. Sensing when sparks are being made (light) can be used to detect grinding or sanding (time when it is actually occurring). Recording the in use time (from sparks, e.g.) and the total time a tool is off a shadow board allows inference of the time spent on air moves. Recording the number of consumables (sanding/grinding discs) allows inferring the time spent actually grinding or sanding. Sensing a distinct vibration of a fixture from using of a particular tool, and/or sensing actual motion and/or position of an operator to identify location and action (certain locations/actions would be tied to particular activities) can be used with many activities. Using particular protective equipment tied to particular activities (face shield for grinding) can also be a way to track time spent on an activity. Certain tools have certain sound characteristics which can be used to identify an activity (with or without directional microphones). Sensors can be combined (floormat #1+hammer sound=hammering at station one, floor mat #2+hammer sound=hammering at station 2), or using sound and a shadow board, sound and sparks, etc. Sensing air or shielding gas flow could be used to detect when a tool or welding power supply is in use. For example, sensing flow of air for an air power grinder or other air powered tools, or shielding gas for a welding power supply, could be used to determine when the grinder, tool or power supply is being used.

One embodiment provides for choosing the method/sensors that provide the most useful data relative to least amount of cost for the sensors. Another embodiment uses an unobtrusive sensor to reduce the likelihood that the operator's actions are affected by the monitoring.

The sensor(s) are preferably tied to a data collection method that will convert the data to information in a clear and intuitive format. Initially, it may dump the data to common data format like Excel® spreadsheet, or a database, which then can be manipulated. The end results are pie charts of time spent, particular activities can be flagged and tallied separately, time of day breakdowns of activity, flagged activities (say non value added), health and safety concerns, quality and/or process and production metrics can be highlighted in red and displayed in a visual format by operator, work station, time of day, shift, day and/or automatic pareto reporting.

With respect to scraping, various sensors and methods to sense when scraping is being performed is to monitor the resting place for scraper, use an RF tag on scraper and/or operator, have a sensor on the scraper that sense a parameter such as force, etc., use an electrical signal on scraper/part, use a localized GPS device on scraper, scan a bar code on the scraper and/or glove, motion sensor such as a simple accelerometer on scraper, a USB/data port (including wireless) on scraper, a sensor that detects wearing of the scraper, a permanent magnet on scraper to collect spatter (which correlates to the amount of spatter), manual recording of scraper use, a scanner to check-in and check-out tools (inhibit until check-in or don't use check-in) such as a bar code scanner, image recognition scanner, weight sensor, RF scanner, video recognition (one robust technique is to use a white board with dark tools or parts thereon) or audio signature—in helmet, safety glasses, grinding shield, temperature sensing (the scraper get hot when used, or sense the heat of the hand holding it), vibration sensing—in part, glove, fixture, tool, helmet on/off sensor, operator motion/physical exertion, voice recognition in helmet—"Grinding" . . . "Welding" . . . , warming from hand, pressure sensor on handle, pressure sensor on tool board. Each of these sensors/methods may be used to identify the time spent scraping. They may also be used with other weld cell activities, such as that described above or below, to determine the time spent doing such activity. The system can include a learning mode where the user teaches the system. For example, in the learning mode the user can grind, and the system creates an audio signature in response to the taught sound. Teaching could also be used with video recognition or the other types of sensing.

Other weld cell activities that can be monitored using the sensors and methods described above and below include inspection of parts, reading a print, compensating (hammering, bending, prying), pre-heating, cambering, looking for parts, using a chipping hammer, wire brushing, using tempil sticks (or measuring temperature in other manners), using a needle gun and waiting. With respect to some activities it is useful to know why it is occurring. For example, waiting can occur when the welder is waiting for supervisor, for help, for a crane, for pre-heat temp, for parts, for inter-pass temperature to be reached, resting, for cool-down, for maintenance issues, etc. Determine why the welder is waiting can be the first step in making the process lean, Waiting can be avoided by improving communication systems, anticipating events that cause waiting, and automating the communication/reporting of the cause that someone is waiting. Monnit® sensors are available that sense temperature, infrared motion, an ID, light, lux (light intensity) open/closed position, magnetic presence, activity, acceleration, current, voltage, and other properties are available. These, or custom sensors, can be used to detect the activity.

Determining the reason for waiting can be done using the sensing described above or below with respect to other activities, or by sensing type of motion, sensing movement without vibration, etc, gps, audio sensor, voice recognition, absence of other (sensable) activity, pre-coded keys on helmet, helmet "flip-up" time, weight of wire on feeder, sense empty fixture, and sense time between sequences. Each of these sensors and methods can be used to monitor other activities in and relating to the weld cell.

Time spent loading and unloading can be determined by sensing weight on crane, weight/pressure sensor on fixture, clamps open/closed, time between welding sequences, video—part motion, light/laser sensor on fixture, crane motion, sensing part shadow board/kan ban bin, # of people in cell, hard hat on (temp/pressure sensor), audio sensor, as well as the sensors described above and below with respect to other activities.

The various sensors are, in one embodiment networked, wired or wireless, or CAN/LAN technology, with or without GPS so the operator, manager etc can determine what and how to resolve non-value added activities. USB/SD cards or other removable storage can be used.

A current sensor on the welding machine with a common 115 volt circuit on the machine and some current threshold slightly lower than a grinder current draw level or the outlet designated to the plug for the grinder with some current threshold would be helpful in monitoring non-welding activity. The welding machine may store the amount of time grinding occurred for a given period of time plus build a tracking and history of the amount of time grinding occurs for some time that is accessible via internet, USB/SD, GPS, LAN, Ethernet/CAN and wire/wireless networks. A similar device is a device that plugs into 115 or 230 volts in the factory bus system or welding machine and has a similar current threshold that senses time and draw deterministic of grinding. The device plugs into the 115 volts or 230 volts and the grinder or other device plugs into this unit. This device added to the outlet would have a similar capability to use internet, USB/SD, GPS, LAN, Ethernet/CAN and wire/wireless networking to monitor.

Such a current sensor could operate on 115 volts or 230 volts and could be used on hoists, hydraulic motors/pumps, robots/automation devices, and other devices used in manufacturing welded products. These devices feeding a hub of data determining where the operator spends time are valuable sources of information to first understand and then determine methods to reduce these non-value added activities in the way of corrective actions and justification for different forming processes, tooling and welding processes that may create the need for grinding and other non-value added activities. The system or hub of data would have the ability to summarize activity by looking in the time and frequency domain and reporting graphs, bar charts and other common methods of statistical analysis. These systems may be taught the current draw by putting the device into the teach mode and running grinders, hoists etc. to establish a threshold.

Another sensor/method uses a reflective tag or light such as led source could be placed on the operators head or body and the cell would have one or more cameras to determine location of the operator and where he or she spends time doing grinding versus welding. This could be used with other information such as the current draw method stated earlier. The system would take camera information and put it into the frequency domain and assess location and time domain to determine amount of time in a location. This method would filter non-recurring locations or activities or activities of insignificant time to reduce computing time and demands. The camera and associated software should have the ability to work on network. Another embodiment uses RF receivers with tracking zones of where is the operator activity. The operator may wear the receiver or the RF emitting device. The various tools may have an RF device on them or the receiver may be on the tool versus the operator to establish how much time per tool for the operators activities including grinding, hoists and tooling. Even how much time the operator looks at prints, job packets and waiting for parts may be tracked.

Another embodiment provides for using microphones or a microphone in the manufacturing cell to determine the overall time of a given activity due to the specific audible frequency of grinding versus welding or using a hoist. These are very specific sounds but not easy to filter out of the background noise to determine what activities and how much time is being spent on a given activity in a manufacturing process. This sound must be filtered and looked at in the frequency domain and compared to typical noise footprints such as a typical grinder or hoist or hammer. This, known footprint, however, may be taught by putting the system in a training mode and running the tool due to the difference in sound of a grinder from one company to another or tool to tool. The sound analysis system may be connected to a network for analysis by the manufacturing engineer or welding engineer or operator for continuous improvement and the reduction of non-value added time.

The system may also communicate to the MRP or ERP system so the part welded is known as well as logging the operator identification or other quality and material tracking information. Therefore, management can see trends by employee and part being made. Also, trends can be evaluated in who did the cutting and machining of parts to look for time related delays.

Other weld cell activities that can be tracked using the sensors/methods described herein include adjusting/changing ppe (personal protection equipment), entering/leaving cell, training, maintenance, fixturing, adjusting welder/machine, rework-correcting mistaken parts—gouging/re-welding, etc., helping another cell, positioning, walking, reporting, talking—communicating with supervisors, etc, breaks, meetings, cleaning (sweeping, organizing, etc), exchanging/switching tools, changing cell layout, changing tool locations, exercising/stretching, operator safety—heat, motion, etc., laying out parts, moving parts, and install/remove spreader bars, Other activities that relate to welding, that may be with or outside of the weld cell, could also be tracked, such as procurement—parts ordering, part fabrication area (cutting/forming/stamping), paint line, final assembly, testing, logistics—movement between the above cells, integration of all of the above into weld cell, service tech monitoring, and who is the operator. These may be tracked using many of the methods/sensors described herein.

Tracking some or many of the activities described herein will allow manufactures to implement continuous improvement, six sigma and lean principles in the weld cell, by providing the data used to make decisions on how to improve.

Other tasks/tools/items that can be monitored include operator, health and safety such as heart rate, heat stress or body temperature (core, head, etc. . . . ), movement, pinch points (i.e., hands, fingers, toes, feet, etc. . . . ), fume exposure, repetitive motion, and quality metrics such as Overall Equipment Effectiveness (OEE), Overall Process Effectiveness (OPE), weld sequence, waiting for x, time spent waiting, pre-heat temperature, inter-pass temperature, post temperature, and these can be automatically reported (with other issues) to management. Such automatic reporting, as well as other reporting is preferably done using software modules. The location of other "moveable" tools, fixtures, parts racks, shadow boards, welding consumables, parts, sub-assemblies, ventilation hoods/equipment (especially relative to the welding gun), overhead cranes, cherry-pickers, positioners, hoists, booms, etc can be tracked, as can the operator location relative to the weldments, as can other tools such as pneumatic or electric hand tools (torque guns, drivers, air-hammers, air-chisels, etc. . . . ), paint or other fluid spray equipment, cutting equipment, etc.

Additional sensors that could be used include sensors such as those above or others that are incorporated into the tools and equipment, and this can reduce the obtrusiveness to an operator. Many of the sensors discussed herein could be wireless. Microelectromechanical systems (MEMS) based sensors for accelerometers, activity, etc. could also be used. The sensors above are sometimes described with respect to one or more particular tasks, tools etc., but can be used for any task, tool, etc.

The invention can be used to implement lean manufacturing, six sigma principles, single piece flow, continuous improvement, etc., in an effort to improve efficiency. The breakdown of activities of the employee(s) and an understanding of waste and through-put constraints in manufacturing obtained as described herein is useful information for such efficiency improvements. Date to determine where activity occurs, when it occurs, and for how long it occurs, can be used to prioritize and assess how to reduce these activities. The data obtained as described herein can also be used to monitor the effect of changes—to determine whether a change that has been implemented results in the efficiency gains expected.

The invention could also be used with other manufacturing/fabrication environments that require skill and manual interaction.

FIG. 1 is a schematic showing a system 100 that controls and receives data from various sensors and the welding power supply. A network connection is also shown. A welding power source 104 has two-way communication with a controller 102. The communication can include typical control and feedback signals.

A loading sensor 116 senses when the part to be welded is being loaded into the fixture. The sensor is preferably a motion based sensor, and includes a time stamp when the loading begins. The begin loading time stamp is provided to controller 102. A tack weld sensor 108 detects welding current used for tack welding, and provides a signal with a time stamp to controller 102, indicating tack welding has started. The tack weld sensor can be a reed switch, combined with the welding output being appropriate for tack welding (as determined by controller 102). Controller 102 then determines the elapsed time between the beginning of the loading and the beginning of the next activity (a tack weld in this example). That difference between the time stamps (or a measured elapsed time) is the time spend fitting up or loading.

After a tack weld the operator begins a final weld, The final weld is detected using sensor 110, which senses current in the weld cable, with the welding output having a setting appropriate for final weld. Alternatively, current feedback from the welding power source indicates the tack or final weld is being performed. A single sensor can be used for both tack and final weld, when combined with information indicative of whether the output is a final or tack output. The time for the tack weld is determined by the controller based on the start of the tack weld, and the start of the next activity (in this example final weld).

The operator begins grinding next, in this example. To retrieve the grinder the operator walks across the weld cell. A plurality of sensor 114 in the floor mats detect the movement of the operator. Sensors 114 are preferably pressure sensitive sensors. The output of sensors 114 is provided to controller 102, which determines the location to which the operator walked is the location of the grinder. The operator walks back to the weldment, and begins grinding. A sensor 106, such as a current sensor on the aux power line detects that the aux power is being used. Sensor 106 could also be an air flow switch on the air supply for the grinder. That information, and the information from sensors 114, allow the controller to determine that grinding is taking place. Controller 102 could similarly detect sanding, either using the same aux power sensor and floor mat sensors, or using a separate sensor on the sander power cord.

Having obtained the time spent fitting up, tack welding, final welding, and grinding, controller 102 summarizes that information in a easily read table, chart or spread sheet. That information is provided via a network connection and over a network or internet 118 to the manager. Alternatives provide for looking at time spent walking (sensed via floor mats) as a separate activity. Other alternatives provide that other sensors, for example those described herein, are used. Another alternative provides using RF transmitters to send the information to a gateway, and then to the internet. Another alternative provides that the signals provided to controller 102 do not include a time stamp, but merely indicate the beginning or end of the activity, and controller 102, or other downstream device, or an intelligent sensor, adds the time stamp (or merely measures an elapsed time).

Figure 2:
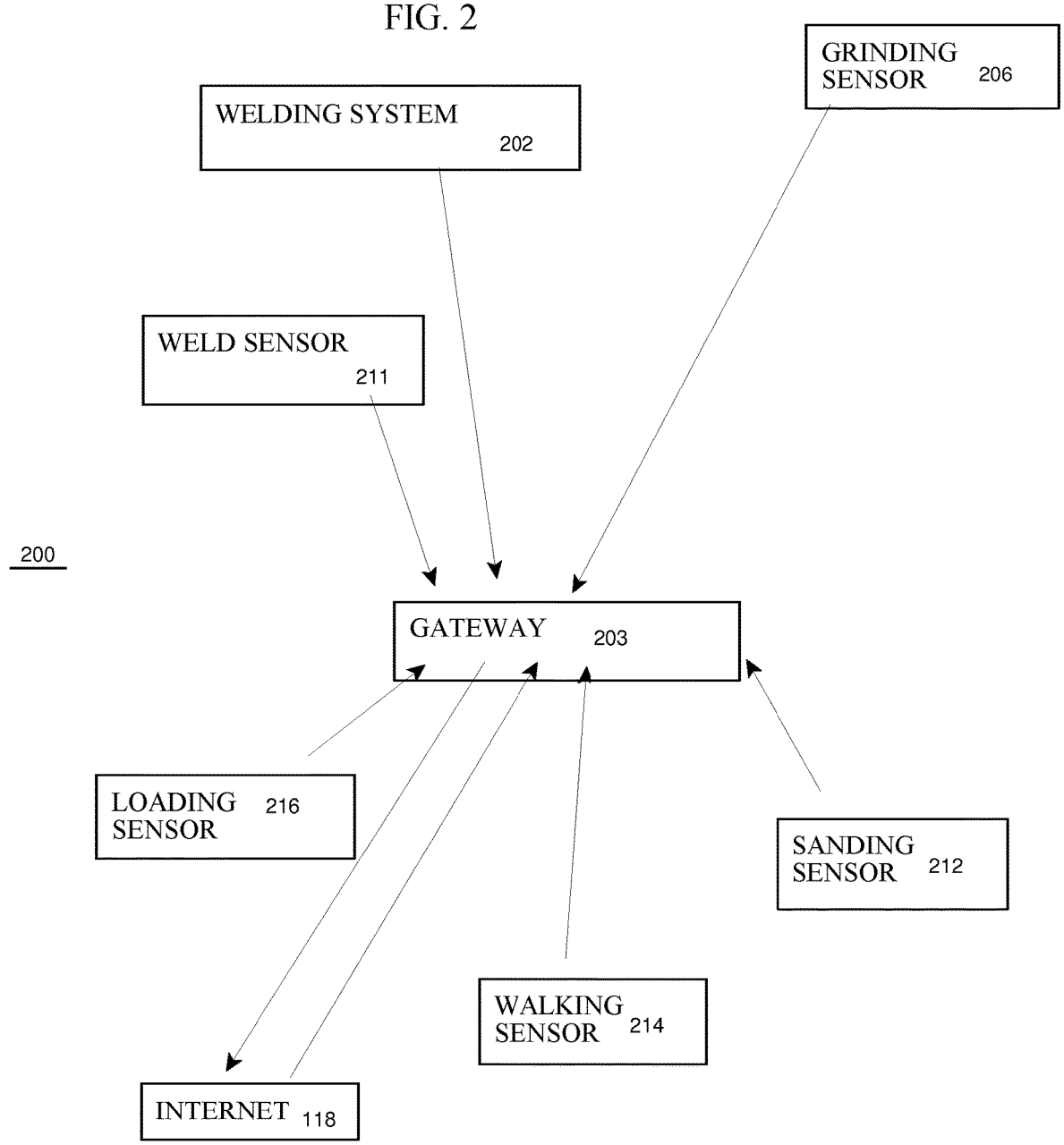
FIG. 2 is block diagram showing one embodiment of the present invention.

FIG. 2 is a schematic showing another embodiment of the invention. This embodiment is similar to that of FIG. 1, but activity tracking system 200 includes a gateway 203, which receives the signals form each of the sensors. Gateway 203 then provides the information to internet or network 118. Welding system 202 includes controller and power source.

The sensors may be those described above. Alternatively, each sensor is a Monnit® RF sensor that transmits to gateway 203 wirelessly. A weld sensor 211 is an RF magnetic field sensor, or a light sensor (to detect the arc). A grinding sensor 206 and a sanding sensor 212 include a reed switch and RF sensor on the power cords for the grinder and sander. Walking sensor 214 includes either pressure sensors in the floor mats or motion sensors. Loading sensor 216 includes a motion sensor. The time spent determination is performed remotely after the data is transmitted to network 118, by comparing start and stop times, or start and next activity start times. The information provided on internet 118 is an email, in one embodiment.

After data is sent to the internet, the data may be stored in a database and then analyzed to create graphs, pie charts, or dashboard, and then provided to the plant manager or others, such as via the internet to a server or to a personal computer.

Another alternative applies the above invention to areas outside the weld cell such as metal cutting, metal bending, painting, material management, finished assembly and so forth. Sensing can be done in the manner described above, and information reported via a gateway or controller to the managers, supervisors, or others. Both low volume/high mix or high volume/low mix production tracking is conceived. The activities sensed and/or tracked, and information provided, include rates of production, material flow, part tracking, assembly rates, events, quality measurements, and other shop floor activity/associated information that can be combined, analyzed, processed and then displayed on dashboards, graphs on PCs or shop floor displays, or within key performance metrics of a production facility. The increased understanding of the factory floor facilitates informed decision making and continuous improvement.

Numerous modifications may be made to the present invention which still fall within the intended scope hereof. Thus, it should be apparent that there has been provided in accordance with the present invention a method and apparatus for tracking weld cell activity that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding system, comprising:
   a sensor configured to detect sensor data relevant to activity within a weld cell; and
   a controller configured to:
      determine, based on the sensor data, whether a welding related task has occurred, the welding related task comprising grinding within the weld cell, sanding within the weld cell, scraping within the weld cell, loading of a part into a fixture in the weld cell, unloading the part from the fixture in the weld cell, or an operator waiting for the part in the weld cell, and
      in response to determining the welding related task has occurred,
         identify a time when the welding related task occurred, and
         report the welding related task and the time when the welding related task occurred, or transmit the welding related task and the time when the welding related task occurred.

2. The welding system of claim 1, further comprising a welding power supply comprising the controller.

3. The welding system of claim 1, wherein the controller is configured to identify the time when the welding related task occurred based on the sensor data.

4. The welding system of claim 1, wherein the controller is configured to: in response to determining the welding related task has occurred, determine whether a duration of the welding related task is more than a threshold duration, and in response to determining the duration is more than the threshold duration, report the welding related task and the time when the welding related task occurred or transmit the welding related task and the time when the welding task occurred.

5. The welding system of claim 1, wherein the sensor comprises a reed switch, a Hall Effect sensor, a current sensor, a pressure sensor, a weight sensor, an air flow sensor, an audio sensor, an optical sensor, a temperature sensor, a bar code scanner, a radio frequency sensor, a global positioning sensor, a motion sensor, a magnetic sensor, or a vibration sensor.

6. The welding system of claim 1, wherein the sensor comprises an audio sensor, the controller being further configured to determine whether the welding related task has occurred based on a comparison of the sensor data with training data.

7. The welding system of claim 6, wherein the comparison comprises a frequency comparison of a first frequency of audio sensor data detected by the audio sensor with a second frequency of previously recorded audio training data.

8. The welding system of claim 1, wherein the sensor comprises a first sensor and the sensor data comprises first sensor data, the welding system further comprising a second sensor configured to detect second sensor data relevant to the activity within the weld cell, and the controller being configured to determine whether the welding related task has occurred based on the first sensor data and the second sensor data.

9. The welding system of claim 8, wherein the second sensor comprises a weight sensor or a pressure sensor, the second sensor being positioned in a floor mat within the weld cell.

10. The welding system of claim 8, wherein the second sensor data indicates which particular piece of protective equipment is being worn by the operator, whether the particular piece of protective equipment is being worn by the operator, or how the particular piece of protective equipment is being worn by the operator.

* * * * *